United States Patent
Yao et al.

(10) Patent No.: US 12,040,507 B2
(45) Date of Patent: Jul. 16, 2024

(54) COMPOSITE LITHIUM BATTERY SEPARATOR AND PREPARATION METHOD THEREFOR

(71) Applicant: SHENZHEN SENIOR TECHNOLOGY MATERIAL CO., LTD., Guangdong (CN)

(72) Inventors: Yongqiang Yao, Guangdong (CN); Xiang Ping, Guangdong (CN); Liuhao Zhang, Guangdong (CN); Bin Ye, Guangdong (CN); Xiufeng Chen, Guangdong (CN)

(73) Assignee: Shenzhen Senior Technology Material Co., Ltd., Guangdong (CN)

( * ) Notice: Subject to any disclaimer, the term of this patent is extended or adjusted under 35 U.S.C. 154(b) by 673 days.

(21) Appl. No.: 17/254,870

(22) PCT Filed: Jun. 26, 2018

(86) PCT No.: PCT/CN2018/092725
§ 371 (c)(1),
(2) Date: Dec. 22, 2020

(87) PCT Pub. No.: WO2020/000164
PCT Pub. Date: Jan. 2, 2020

(65) Prior Publication Data
US 2021/0265702 A1 Aug. 26, 2021

(51) Int. Cl.
| | |
|---|---|
| *H01M 50/449* | (2021.01) |
| *H01M 10/052* | (2010.01) |
| *H01M 50/403* | (2021.01) |
| *H01M 50/417* | (2021.01) |
| *H01M 50/42* | (2021.01) |
| *H01M 50/426* | (2021.01) |
| *H01M 50/434* | (2021.01) |
| *H01M 50/446* | (2021.01) |
| *H01M 50/491* | (2021.01) |
| *H01M 50/497* | (2021.01) |

(52) U.S. Cl.
CPC ....... *H01M 50/449* (2021.01); *H01M 10/052* (2013.01); *H01M 50/403* (2021.01); *H01M 50/417* (2021.01); *H01M 50/42* (2021.01); *H01M 50/426* (2021.01); *H01M 50/434* (2021.01); *H01M 50/446* (2021.01); *H01M 50/491* (2021.01); *H01M 50/497* (2021.01)

(58) Field of Classification Search
CPC ............. H01M 50/449; H01M 50/497; H01M 50/403; H01M 50/417; H01M 50/426; H01M 50/491; H01M 50/446; H01M 50/434; H01M 50/42; H01M 10/052
See application file for complete search history.

(56) References Cited

U.S. PATENT DOCUMENTS

| | | | | |
|---|---|---|---|---|
| 2004/0105052 | A1* | 6/2004 | Uekita | G02B 5/0226 349/112 |
| 2009/0111026 | A1* | 4/2009 | Kim | H01M 10/056 429/252 |
| 2013/0224556 | A1* | 8/2013 | Hong | H01M 50/457 429/144 |
| 2015/0179999 | A1* | 6/2015 | Kim | C08J 7/0427 264/129 |
| 2017/0170440 | A1* | 6/2017 | Cao | C08J 7/0427 |

FOREIGN PATENT DOCUMENTS

| | | | |
|---|---|---|---|
| CN | 103035866 | A | 4/2013 |
| CN | 104183805 | A | 12/2014 |
| CN | 104446515 | * | 3/2015 |
| CN | 105449139 | A | 3/2016 |
| CN | 107658409 | A | 2/2018 |

OTHER PUBLICATIONS

The Decision to grant a Patent issued by KPO (Year: 2022).*
The Decision to grant a Patent issued by JPO (Year: 2022).*

* cited by examiner

*Primary Examiner* — Alexander Usyatinsky
(74) *Attorney, Agent, or Firm* — Meunier Carlin & Curfman LLC

(57) ABSTRACT

The present disclosure relates to a composite lithium battery separator and a preparation process therefor. The composite lithium battery separator includes a base film or a ceramic film, and a coating layer covering one side or both sides of the base film or the ceramic film. The coating layer is formed by coating a slurry. The slurry includes 5%-45% by weight of a coating polymer and 55%-95% by weight of an organic solvent, and the coating polymer includes 10-100 parts by weight of a fluorine or acrylic resin polymer, 0.5-10 parts of a polymer adhesive, and 0-90 parts of inorganic nanoparticles.

18 Claims, 2 Drawing Sheets

COMPOSITE LITHIUM BATTERY SEPARATOR AND PREPARATION METHOD THEREFOR

PRIORITY

This application is a U.S. national application of the international application number PCT/CN2018/092725 filed on Jun. 26, 2018, the contents of all of which are incorporated herein by reference.

TECHNICAL FIELD

The present disclosure relates to the field of lithium ion batteries, in particular, to a composite lithium battery separator and a method for preparing the same.

BACKGROUND ART

In recent years, with the boom of the 3C market and the electric vehicle market, the demand for lithium ion batteries in the market is increasing, and some new requirements are also proposed for lithium ion batteries. As one of important components of the lithium ion batteries, the separator plays a role of electronic insulation between the positive electrode material and the negative electrode material to ensure mechanical isolation between the positive and negative electrodes. The separator has a certain aperture and porosity, to ensure low resistance and high ion conductivity, and good permeability to lithium ions. The characteristics and quality of the separator severely affect the safety performance, rate performance, cycle life and basic electrical performance of the battery. For example, on conventional consumer electronic products, in order to pursue a high battery energy density, more electrode materials need to be accommodated in a small volume, therefore the thickness of the separator is smaller and smaller; the increased mileage of electric vehicles also has higher and higher requirements to the battery energy density, resulting in smaller and smaller thickness of the separator.

However, in the tendency that the separator of the lithium ion battery becomes thinner and thinner, some problems in performance are also brought about: the static electricity of the separator is too large, which leads to poor fit with an electrode piece in assembling the battery or shrinkage of the separator under high-temperature conditions, thereby causing contact between the positive and negative electrodes of the battery and resulting in short circuit inside the battery; the hardness and mechanical properties of thin battery cells are poor, which results in degraded performance of the lithium battery products. In addition, seen from the structure of the lithium batteries, the liquid may leak due to the poor liquid absorption capacity of the separator in the liquid battery.

Therefore, how to improve the liquid adsorption capacity of the separator and reduce the short circuit of the battery becomes a problem urgently to be solved for the current lithium batteries.

SUMMARY

In order to overcome at least one of the above disadvantages, the present disclosure provides a composite lithium battery separator, which has high ion conductivity, good liquid absorption/retention capacity, strong peeling resistance, and high adhesion to positive and negative electrode pieces.

The present disclosure further provides a method for preparing a composite lithium battery separator, which is suitable for mass production.

At least one of the objectives of the present disclosure may be achieved by the following technical measures.

A composite lithium battery separator, which includes a base film or a ceramic film, and a coating layer covering a single side or two sides of the base film or the ceramic film. The coating layer is formed by coating a slurry. The slurry includes, in percentage by weight, 5%-45% of a coating polymer and 55%-95% of an organic solvent, wherein the coating polymer includes, in parts by weight, 10-100 parts of a fluorine resin polymer or acrylic resin polymer, 0.5-10 parts of a polymer adhesive and 0-90 parts of inorganic nanoparticles.

In a preferred embodiment, the thickness of the base film is 5-30 μm, preferably 10-20 μm; the porosity is 30%-60%, preferably 40%-50%; and the thickness of the coating layer is 0.5-10 μm, preferably 3-8 μm.

In a preferred embodiment, the base film is one selected from the group consisting of a polyethylene base film, a polypropylene base film, a polypropylene/polyethylene/polypropylene composite base film, a polyimide base film, a polyvinylidene fluoride base film, a polyethylene nonwoven base film, a polypropylene nonwoven base film and a polyimide nonwoven base film.

In a preferred embodiment, the organic solvent contains at least one selected from the group consisting of acetone, dimethylacetamide, dimethylformamide, chloroform, dichloromethane, dichloroethane, dimethyl sulfoxide and N-methylpyrrolidone.

In a preferred embodiment, the fluorine resin polymer or acrylic resin polymer contains at least one selected from the group consisting of polyvinylidene fluoride, a polyvinylidene fluoride and hexafluoropropylene copolymer, a polyvinylidene fluoride and dichloroethylene copolymer, polystyrene, n-butyl polyacrylate, polymethyl methacrylate, polyethylmethacrylate, poly(t-butyl acrylate), polyvinyl acetate, polyacrylonitrile, polyvinyl acetate, acrylamide and polymethyl acrylate; and the molecular weight of the fluorine resin polymer or acrylic resin polymer is 50000-500000, preferably 200000-300000.

In a preferred embodiment, the polymer adhesive contains at least one selected from the group consisting of styrene-butadiene latex, styrene-acrylic latex, polyvinyl acetate, polyvinyl alcohol, polyethyl acrylate, polybutyl methacrylate, an ethylene-vinyl acetate copolymer and polyurethane.

In a preferred embodiment, the inorganic nanoparticles are mainly a mixture of conventional inorganic particles and inorganic particles having lithium ion conducting capability, and the weight ratio of the conventional inorganic particles to the inorganic particles having lithium ion conducting capability is 80-95:20-5.

In a preferred embodiment, the conventional inorganic particles contain at least one selected from the group consisting of aluminum oxide, silica, barium titanate, magnesium oxide, boehmite, titanium oxide, calcium carbonate and zirconium dioxide.

In a preferred embodiment, the particle size of the conventional inorganic particles ranges 0.01-10 μm; the conventional inorganic particles are composed of inorganic particles with a small particle size and inorganic particles with a big particle size in a weight ratio of 80-90:20-10, wherein the particle size of the inorganic particles with a small particle size ranges 0.01-0.2 μm, and the particle size of the inorganic particles with a big particle size ranges 0.2-10 μm.

In a preferred embodiment, the inorganic particles having lithium ion conducting capability contain at least one selected from the group consisting of lithium phosphate, lithium titanium phosphate, lithium aluminum titanium phosphate, lithium nitrogen compound and lanthanum lithium titanate.

In a preferred embodiment, the coating polymer further includes 0.5-10 parts by weight of a dispersing agent, and the dispersing agent contains at least one selected from the group consisting of a carboxylate fluorine dispersing agent, triethyl phosphate, a sulfonate fluorine dispersing agent, sodium polyacrylate, potassium polyacrylate and polyethylene glycol.

In a preferred embodiment, the coating polymer further includes 0.1-8 parts by weight of a wetting agent, and the wetting agent contains at least one selected from the group consisting of polycarbonate, sodium lauryl sulfate, sodium dodecyl benzene sulfonate, sodium polyacrylate, polyvinyl alcohol, fluoroalkyl methoxy ether alcohol, fluoroalkyl ethoxy ether alcohol, alkylphenol polyoxyethylene ether, fatty alcohol polyoxyethylene ether, fatty acid polyoxyethylene ether and polyoxyethylene alkyl amide.

In a preferred embodiment, the coating polymer further includes 0.1-10 parts by weight of a pore-forming agent, and the pore-forming agent is deionized water.

In a preferred embodiment, the coating polymer further includes 0.1-5 parts by weight of an antistatic agent, and the antistatic agent contains at least one selected from the group consisting of octadecyl dimethyl quaternary ammonium nitrate, trimethyl octadecyl ammonium acetate, N-hexadecylpyridine nitrate, N-alkyl amino acid salt, betaine type and imidazoline salt derivatives.

A method for preparing the above composite lithium battery separator, including the following steps:

S1, uniformly stirring weighed fluorine resin polymer or acrylic resin polymer and inorganic nanoparticles;

S2, adding an organic solvent according to a change gradient of solid content, and stirring the resultant uniformly;

S3, adding a polymer adhesive, and after stirring uniformly, filtering the resultant to obtain a slurry; and S4, coating the slurry on a single side or two sides of a base film or a ceramic film, and performing coagulation, rinsing, drying, and shaping to obtain the composite lithium battery separator.

In a preferred embodiment, in step S1 the stirring speed is 40-80 R, and the stirring duration is 15-40 min; in step S3 the stirring speed is 20-60 R, the dispersing speed is 300-800 R, the stirring duration is 15-30 min, and the slurry viscosity is 50-1000 cp.

In a preferred embodiment, in step S2, 0.5-10 parts by weight of the dispersing agent is added and stirred, wherein the stirring speed is 40-90 R, and the stirring duration is 10-20 min, and then the organic solvent is added.

In a preferred embodiment, a method for adding the organic solvent is: firstly adding the organic solvent gradually according to 4%-5% of a total amount of the organic solvent, wherein the addition is stopped when the powder is just kneaded and agglomerated, the kneaded powder is stirred at a stirring speed of 80-120 R for 30-90 min, then, adding the organic solvent according to the change gradient of the solid content, so that the solid content of the slurry is from high to low until a predetermined solid content is met.

In a preferred embodiment, when the solid content is higher than the predetermined solid content, the stirring speed is 40-100 R, the dispersing speed is 2000-4000 R, and the stirring duration is 15-45 min; and when the solid content meets the predetermined solid content, the stirring speed is 40-80 R, the dispersing speed is 3000-4500 R, and the stirring duration is 30-90 min.

In a preferred embodiment, in step S4, a coating method includes one of a dip coating method, a microgravure coating method, a spray coating method, a slide coating method and a slot coating method, and the drying temperature is 40-80° C.

Compared with the prior art, advantages and beneficial effects of the present disclosure at least include the following:

1. The composite lithium battery separator of the present disclosure has a pore structure existing on the base film or the ceramic film, and a porous structure in the coating layer formed by the inorganic nanoparticles and the binder coated on the base film or the ceramic film, therefore, the composite lithium battery separator has a high coating porosity, can increase a space volume where liquid electrolyte can penetrate, greatly improves the lithium ion conductivity and the liquid absorption and retention rates of the separator, forms an electrolyte in a gel state, and reduces the risk of liquid leakage of the battery; the peeling resistance is strong, and the adhesion to the positive and negative electrode pieces is high.
2. The slurry prepared according to the method of the present disclosure has high stability, and still can be normally used after being hermetically placed for more than 60 days, without significant delamination and precipitation, which is beneficial to continuous and mass production of the coating layer in the composite lithium battery separator, therefore, the method of the present disclosure is suitable for mass production.
3. The inorganic particles having lithium ion conducting capability in the inorganic nanoparticles of the present disclosure can have a synergistic effect with conventional inorganic particles, can improve the lithium ion conductivity, and improve the battery performance.
4. In the present disclosure, the inorganic particles with a big particle size and the inorganic particles with a small particle size are used simultaneously, so that the inorganic particles in the coating layer will form a relatively dense accumulation state, thereby improving the high-temperature resistance of the coating layer, and reducing the thermal shrinkage of the separator.

BRIEF DESCRIPTION OF DRAWINGS

In order to more clearly illustrate the technical solutions in specific embodiments of the present disclosure or in the prior art, accompanying drawings which need to be used for description of the specific embodiments or the prior art will be introduced briefly below, and apparently, the accompanying drawings in the following description are merely some embodiments of the present disclosure, and a person ordinarily skilled in the art still could obtain other drawings in light of these accompanying drawings without using creative efforts.

DETAILED DESCRIPTION OF EMBODIMENTS

Figure 1:
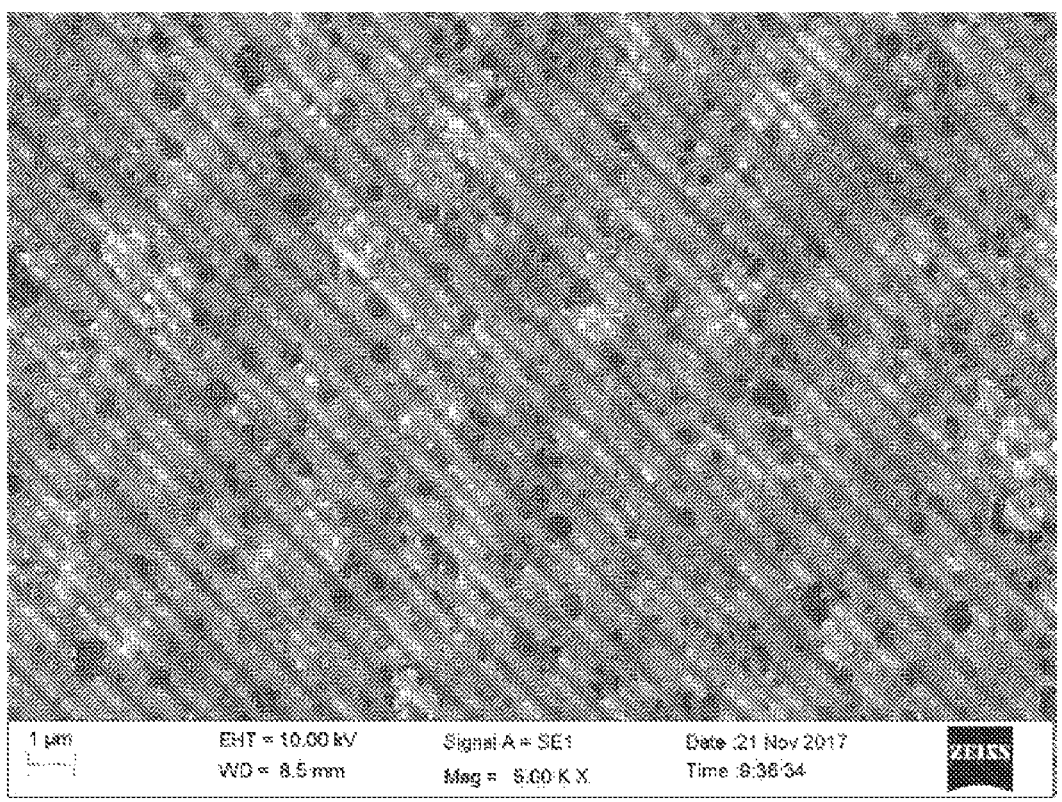
FIG. 1 is an electron microscopy image of a composite lithium battery separator in Example 1 of the present disclosure.

Technical solutions of the present disclosure will be described clearly and completely below in combination with the accompanying drawings and specific embodiments, while a person skilled in the art would understand that the following examples described are some but not all examples of the present disclosure, and they are merely used for illustrating the present disclosure, but should not be considered as limitation on the scope of the present disclosure. Based on the examples in the present disclosure, all of other examples obtained by a person ordinarily skilled in the art without using creative efforts shall fall within the scope of protection of the present disclosure. If no specific conditions are specified in the examples, they are carried out under normal conditions or conditions recommended by manufacturers. If manufacturers of reagents or apparatuses used are not specified, they are conventional products commercially available.

The present disclosure provides a composite lithium battery separator, which includes a base film or a ceramic film, and a coating layer covering a single side or two sides of the base film or the ceramic film. The coating layer is formed by coating a slurry. The slurry includes, in percentage by weight, 5%-45% of a coating polymer and 55%-95% of an organic solvent, wherein the coating polymer includes, in parts by weight, 10-100 parts of a fluorine resin polymer or acrylic resin polymer, 0.5-10 parts of a polymer adhesive and 0-90 parts of inorganic nanoparticles. Optionally, the thickness of the base film is 5-30 μm, preferably 10-20 μm; the porosity is 30%-60%, preferably 40%-50%; and the thickness of the coating layer is 0.5-10 μm, preferably 3-8 μm.

In the above, the fluorine resin polymer or acrylic resin polymer is used as a first binder, the polymer adhesive is used as a second binder, and these oily polymers and the inorganic nanoparticles are compounded to form the coating layer. Therefore, the composite lithium battery separator of the present disclosure has a pore structure existing on the base film or the ceramic film, and a porous structure in the coating layer formed by the inorganic nanoparticles and the binder coated on the base film or the ceramic film, therefore, the composite lithium battery separator has a high coating porosity, can increase a space volume where liquid electrolyte can penetrate, greatly improves the lithium ion conductivity and the liquid absorption and retention rates of the separator, forms an electrolyte in a gel state, and reduces the risk of liquid leakage of the battery. Furthermore, the van der Waals force between the polar functional groups on molecular chains of the first binder and the second binder and the electrode material will allow the separator and the electrode piece to be well bonded together, thereby reducing the occurrence probability of short circuit of the battery, and improving the hardness and the shape retention capacity of the battery.

The base film in the composite lithium battery separator of the present disclosure specifically may be one selected from the group consisting of a polyethylene base film, a polypropylene base film, a polypropylene/polyethylene/polypropylene composite base film, a polyimide base film, a polyvinylidene fluoride base film, a polyethylene nonwoven base film, a polypropylene nonwoven base film and a polyimide nonwoven base film.

The organic solvent adopted by the composite lithium battery separator of the present disclosure specifically may contain at least one selected from the group consisting of acetone, dimethylacetamide (DMAC), dimethylformamide (DMF), chloroform, dichloromethane, dichloroethane, dimethyl sulfoxide and N-methylpyrrolidone (NMP).

The fluorine resin polymer or acrylic resin polymer adopted by the composite lithium battery separator of the present disclosure specifically may contain at least one selected from the group consisting of polyvinylidene fluoride, a polyvinylidene fluoride and hexafluoropropylene copolymer, a polyvinylidene fluoride and dichloroethylene copolymer, polystyrene, n-butyl polyacrylate, polymethyl methacrylate, polyethylmethacrylate, poly(t-butyl acrylate), polyvinyl acetate, polyacrylonitrile, polyvinyl acetate, acrylamide and polymethyl acrylate; and the molecular weight of the fluorine resin polymer or acrylic resin polymer is 50000-500000, preferably 200000-300000.

The polymer adhesive adopted by the composite lithium battery separator of the present disclosure specifically may contain at least one selected from the group consisting of styrene-butadiene latex, styrene-acrylic latex, polyvinyl acetate (PVAC), polyvinyl alcohol (PVA), polyethyl acrylate (PEA), polybutyl methacrylate (PBMA), an ethylene-vinyl acetate copolymer (EVA) and polyurethane (PU).

The inorganic nanoparticles adopted by the composite lithium battery separator of the present disclosure specifically are mainly a mixture of conventional inorganic particles and inorganic particles having lithium ion conducting capability, and the weight ratio of the conventional inorganic particles to the inorganic particles having lithium ion conducting capability is 80-95:20-5. The inorganic particles having lithium ion conducting capability in the inorganic nanoparticles can have a synergistic effect with conventional inorganic particles (having piezoelectricity), can improve the lithium ion conductivity, and improve the battery performance.

Optionally, the conventional inorganic particles contain at least one selected from the group consisting of aluminum oxide, silica, barium titanate, magnesium oxide, boehmite, titanium oxide, calcium carbonate and zirconium dioxide. The particle size of the conventional inorganic particles ranges 0.01-10 μm; the conventional inorganic particles are composed of inorganic particles with a small particle size and inorganic particles with a big particle size in a weight ratio of 80-90:20-10, wherein the particle size of the inorganic particles with a small particle size ranges 0.01-0.2 μm, and the particle size of the inorganic particles with a big particle size ranges 0.2-10 μm. The inorganic particles with a big particle size and the inorganic particles with a small particle size are used simultaneously in the present disclosure, so that the inorganic particles in the coating layer will form a relatively dense accumulation state, thereby improving the high-temperature resistance of the coating layer, and reducing the thermal shrinkage of the separator.

Optionally, the inorganic particles having lithium ion conducting capability contain at least one selected from the group consisting of lithium phosphate, lithium titanium phosphate, lithium aluminum titanium phosphate, lithium nitrogen compound and lanthanum lithium titanate.

On the basis of the above technical solution, the coating polymer in the present disclosure further may include 0.5-10 parts by weight of a dispersing agent, and the dispersing agent contains at least one selected from the group consisting of a carboxylate fluorine dispersing agent, triethyl phosphate (TEP), a sulfonate fluorine dispersing agent, sodium polyacrylate (PAA-Na), potassium polyacrylate (PAA-K) and polyethylene glycol.

On the basis of the above technical solution, the coating polymer in the present disclosure further may include 0.1-8 parts by weight of a wetting agent, and the wetting agent contains at least one selected from the group consisting of polycarbonate, sodium lauryl sulfate, sodium dodecyl benzene sulfonate, sodium polyacrylate, polyvinyl alcohol, fluoroalkyl methoxy ether alcohol, fluoroalkyl ethoxy ether alcohol, alkylphenol polyoxyethylene ether (APEO), fatty alcohol polyoxyethylene ether (AEO), fatty acid polyoxyethylene ether (FMEE) and polyoxyethylene alkyl amide.

On the basis of the above technical solution, the coating polymer in the present disclosure further may include 0.1-10 parts by weight of a pore-forming agent, and the pore-forming agent is deionized water. The composite lithium battery separator of the present disclosure has the pore structure existing on the base film or the ceramic film, and the porous structure in the coating layer, and meanwhile, the pore-forming agent can greatly improve the pore-forming quantity of the coating layer, so that the performance of the composite lithium battery separator is further improved. The pore-forming agent is preferably deionized water, which has a low cost, and the formed coating layer will not release too many impurities in a coagulating tank and a rinsing tank in the coagulating and rinsing processes, then the wastewater recycling difficulty of the coagulating tank and the rinsing tank is reduced.

On the basis of the above technical solution, the coating polymer in the present disclosure further may include 0.1-5 parts by weight of an antistatic agent, and the antistatic agent contains at least one selected from the group consisting of octadecyl dimethyl quaternary ammonium nitrate (SN), trimethyl octadecyl ammonium acetate, N-hexadecylpyridine nitrate, N-alkyl amino acid salt, betaine type and imidazoline salt derivatives. In the present disclosure, the antistatic agent is used, so that the formed separator has less surface static electricity, then the problem of uneven attachment between the separator and the electrode piece in the assembling process is reduced, and the battery is easy to be assembled; the separator has high peeling resistance and high adhesion to the positive and negative electrode pieces, then the hardness of the battery is improved, and the risk of short circuit inside the battery is greatly reduced.

The present disclosure further provides a method for preparing the above composite lithium battery separator, including the following steps:

S1, uniformly stirring weighed fluorine resin polymer or acrylic resin polymer and inorganic nanoparticles (specifically including inorganic particles with a big particle size, inorganic particles with a small particle size and inorganic particles having lithium ion conducting capability), wherein optionally, the above raw materials are placed in a small-capacity stirring tank and stirred uniformly at a stirring speed of 40-80 R for 15-40 min.

S2, adding an organic solvent according to a change gradient of solid content, and stirring the resultant uniformly.

Optionally, first, a dispersing agent is added to the small-capacity stirring tank and stirred, and the organic solvent is added gradually, wherein the dispersing agent is added at a stirring speed of 40-90 R, and the stirring duration is 10-20 min; first the organic solvent is added gradually according to 4%-5% of a total amount, wherein the addition is stopped when the powder is just kneaded and agglomerated, the kneaded powder is stirred at a stirring speed of 80-120 R for 30-90 min, and the slurry in the small-capacity stirring tank is transferred to a large-capacity stirring tank;

the organic solvent is added to the large-capacity stirring tank according to the change gradient of the solid content, so that the solid content of the slurry is from high to low until a predetermined solid content is met (high→medium→satisfied solid content), and the slurry is stirred uniformly. In this process, when the solid content is higher than the predetermined solid content, the stirring speed is 40-100 R, the dispersing speed is 2000-4000 R, and the stirring duration is 15-45 min; and when the solid content meets the predetermined solid content, the stirring speed is 40-80 R, the dispersing speed is 3000-4500 R, and the stirring duration is 30-90 min.

S3, adding a polymer adhesive, and after stirring uniformly, filtering the resultant to obtain a slurry, wherein optionally, the polymer adhesive, a wetting agent, a pore-forming agent and an antistatic agent are added to the large-capacity stirring tank and stirred uniformly, wherein the stirring speed is 20-60 R, the dispersing speed is 300-800 R, the stirring duration is 15-30 min, and the slurry viscosity is 50-1000 cp; and optionally, filtration is performed with a 200 mesh nylon screen. The slurry prepared according to the above method of the present disclosure has high stability, and still can be normally used after being hermetically placed for more than 60 days, without significant delamination and precipitation, which is beneficial to continuous and mass production of the coating layer in the composite lithium battery separator.

S4, coating the slurry on a single side or two sides of a base film or a ceramic film, and performing coagulation, rinsing, drying, and shaping to obtain the composite lithium battery separator. The coating method includes one of a dip coating method, a microgravure coating method, a spray coating method, a slide coating method and a slot coating method, and the drying temperature is 40-80° C.

The above solutions are further described below in connection with specific examples and comparative examples.

Example 1

The present disclosure further provides a composite lithium battery separator, prepared according to the following steps:

(1) 3 kg of a polyvinylidene fluoride and hexafluoropropylene copolymer, 2.42 kg of aluminum oxide powder with a big particle size, 430 g of aluminum oxide powder with a small particle size and 150 g of lithium titanium phosphate were placed in a small-capacity stirring tank and stirred at a rotating speed of 70 R for 25 min.

(2) To the small-capacity stirring tank 120 g of polyethylene glycol was added, and 1.5 kg of NMP was gradually added, the powder was stirred to knead and agglomerate, and was continuously stirred at a rotating speed of 110 R in this state for 50 min; and after being stirred well, the slurry in the small-capacity stirring tank was transferred to a large-capacity stirring tank;

(3) To the large-capacity stirring tank, 3 kg of NMP was added so that a solid content of the slurry was 58%, and the slurry was stirred at a stirring speed of 75 R and a dispersing speed of 3000 R for 20 min; 10 kg of NMP was added continuously to make the solid content of the slurry 30%, and the slurry was stirred at a stirring speed of 75 R and a dispersing speed of 3000 R for 20 min; 11.15 kg of NMP was added continuously to make the solid content of the slurry 19.3%, and the slurry was stirred at a stirring speed of 80 R and a dispersing speed of 3500 R for 50 min.

(4) To the large-capacity stirring tank 180 g of polyvinyl alcohol, 60 g of sodium lauryl sulfate, 30 g of deionized water and 60 g of octadecyl dimethyl quaternary ammonium nitrate were added, respectively, the slurry was stirred at a stirring speed of 30 R and a dispersing speed of 600 R for 30 min, and after being stirred uniformly, the slurry was filtered through a 200 mesh nylon screen to obtain a slurry having a solid content of 20% and viscosity of 210 cp.

(5) The slurry was coated on two sides of a polypropylene base film having a thickness of 16 μm and a porosity of 47% using a microgravure coating method, and the composite lithium battery separator was prepared after coagulation, rinsing, drying, and shaping, wherein the thickness of the composite lithium battery separator was 23 μm, and the thickness of the coating layer on each side surface was 3.5 μm.

Example 2

The present example provides a composite lithium battery separator, prepared according to the following steps:

(1) 3 kg of a polyvinylidene fluoride and dichloroethylene copolymer, 2.42 kg of boehmite powder with a big particle size, 430 g of boehmite powder with a small particle size and 150 g of lithium phosphate were placed in a small-capacity stirring tank and stirred at a rotating speed of 70 R for 25 min.

(2) A slurry having a solid content of 20% and viscosity of 230 cp was obtained according to (2)-(4) in Example 1;

(3) The slurry was coated on two sides of a polypropylene base film having a thickness of 12 μm and a porosity of 42% using a microgravure coating method, and the composite lithium battery separator was prepared after coagulation, rinsing, drying, and shaping, wherein the thickness of the composite lithium battery separator was 18 μm, and the thickness of the coating layer on each side surface was 3 μm.

Example 3

The present example provides a composite lithium battery separator, prepared according to the following steps:

(1) 3 kg of a first binder (polymethyl methacrylate:polyvinylidene fluoride=20:80), 3.6 kg of boehmite powder with a big particle size, 700 g of boehmite powder with a small particle size and 200 g of lithium aluminum titanium phosphate were placed in a small-capacity stirring tank and stirred at a rotating speed of 60 R for 30 min.

(2) To the small-capacity stirring tank 172.5 g of sodium polyacrylate was added, and 2 kg of acetone was gradually added, the powder was stirred to knead and agglomerate, and was continuously stirred at a rotating speed of 110 R in this state for 50 min; and after being stirred well, the slurry in the small-capacity stirring tank was transferred to a large-capacity stirring tank.

(3) To the large-capacity stirring tank, 4 kg of acetone was added, so that a solid content of the slurry was 52%, and the slurry was stirred at a stirring speed of 75 R and a dispersing speed of 3000 R for 20 min; 10 kg of NMP was added continuously to make the solid content of the slurry 32%, and the slurry was stirred at a stirring speed of 75 R and a dispersing speed of 3000 R for 20 min; 7.9 kg of NMP was added continuously to make the solid content of the slurry 24.3%, and the slurry was stirred at a stirring speed of 80 R and a dispersing speed of 3500 R for 50 min.

(4) To the large-capacity stirring tank 180 g of styrene-acrylic latex, 60 g of sodium dodecyl benzene sulfonate, 30 g of deionized water and 60 g of trimethyl octadecyl ammonium acetate were added, respectively, the slurry was stirred at a stirring speed of 30 R and a dispersing speed of 600 R for 30 min, and after being stirred uniformly, the slurry was filtered through a 200 mesh nylon screen to obtain a slurry having a solid content of 25% and viscosity of 160 cp.

(5) The high-adhesiveness slurry was coated on two sides of a polyethylene base film having a thickness of 12 μm and a porosity of 40% using a spray coating method, and the composite lithium battery separator was prepared after coagulation, rinsing, drying, and shaping, wherein the thickness of the composite lithium battery separator was 16 μm, and the thickness of the coating layer on each side surface was 2 μm.

Example 4

The present example provides a composite lithium battery separator, prepared according to the following steps:

(1) 3.5 kg of a first binder (polyvinylidene fluoride and hexafluoropropylene copolymer:polymethyl methacrylate=90:10), 4.4 kg of titanium dioxide powder with a big particle size, 800 g of titanium dioxide powder with a small particle size and 300 g of lithium nitrogen compound were placed in a small-capacity stirring tank and stirred at a rotating speed of 50 R for 30 min.

(2) To the small-capacity stirring tank 180 g of triethyl phosphate was added, and 2.5 kg of DMAC was gradually added, the powder was stirred to knead and agglomerate, and was continuously stirred at a rotating speed of 110 R in this state for 50 min; and after being stirred well, the slurry in the small-capacity stirring tank was transferred to a large-capacity stirring tank.

(3) To the large-capacity stirring tank 5 kg of DMAC was added, so that a solid content of the slurry was 55%, and the slurry was stirred at a stirring speed of 75 R and a dispersing speed of 3000 R for 20 min; 8 kg of NMP was added continuously to make the solid content of the slurry 37%, and the slurry was stirred at a stirring speed of 75 R and a dispersing speed of 3000 R for 20 min; 6.9 kg of NMP was added continuously to make the solid content of the slurry 29.1%, and the slurry was stirred at a stirring speed of 80 R and a dispersing speed of 3500 R for 50 min.

(4) To the large-capacity stirring tank 270 g of polybutyl methacrylate, 60 g of polycarbonate, 45 g of deionized water and 90 g of N-hexadecylpyridine nitrate were added, respectively, the slurry was stirred at a stirring speed of 30 R and a dispersing speed of 600 R for 30 min, and after being stirred uniformly, the slurry was filtered through a 200 mesh nylon screen to obtain a slurry having a solid content of 30% and viscosity of 400 cp.

(5) The high-adhesiveness slurry was coated on two sides of a PP/PE/PP composite base film having a thickness of 16 μm and a porosity of 45% using a dip coating method, and the composite lithium battery separator was prepared after coagulation, rinsing, drying, and shaping, wherein the thickness of the composite lithium battery separator was 20 μm, and the thickness of the coating layer on each side surface was 2 μm.

Example 5

The present example provides a composite lithium battery separator, prepared according to the following steps:

(1) 4.8 kg of a polyvinylidene fluoride and hexafluoropropylene copolymer, 969 g of aluminum oxide powder with a big particle size, 171 g of aluminum oxide powder with a small particle size and 60 g of lanthanum lithium titanate were placed in a small-capacity stirring tank and stirred at a rotating speed of 70 R for 30 min.

(2) To the small-capacity stirring tank 120 g of a sulfonate fluorine dispersing agent was added, and 1.5 kg of NMP was gradually added, the powder was stirred to knead and agglomerate, and was continuously stirred at a rotating speed of 110 R in this state for 50 min; and after being stirred well, the slurry in the small-capacity stirring tank was transferred to a large-capacity stirring tank.

(3) To the large-capacity stirring tank 3 kg of NMP was added, so that a solid content of the slurry was 58%, and the slurry was stirred at a stirring speed of 75 R and a dispersing speed of 3000 R for 20 min; 15 kg of NMP was added continuously to make the solid content of the slurry 24%, and the slurry was stirred at a stirring speed of 75 R and a dispersing speed of 3000 R for 20 min; 17 kg of NMP was added continuously to make the solid content of the slurry 14.4%, and the slurry was stirred at a stirring speed of 80 R and a dispersing speed of 3500 R for 50 min.

(4) To the large-capacity stirring tank 180 g of an ethylene-vinyl acetate copolymer, 80 g of fluoroalkyl methoxy ether alcohol, 30 g of deionized water and 60 g of N-alkyl amino acid salt were added, respectively, the slurry was stirred at a stirring speed of 30 R and a dispersing speed of 600 R for 30 min, and after being stirred uniformly, the slurry was filtered through a 200 mesh nylon screen to obtain a slurry having a solid content of 15% and viscosity of 280 cp.

(5) The slurry was coated on two sides of a single-sided ceramic film having a thickness of 16 μm using a microgravure coating method, and the composite lithium battery separator was prepared after coagulation, rinsing, drying, and shaping, wherein the thickness of the composite lithium battery separator was 18 μm, and the thickness of the coating layer on each side surface was 1 μm.

Comparative Example 1

The present comparative example provides a lithium battery separator, which is a polypropylene base film having a thickness of 16 μm and a porosity of 47%, and is not subjected to any coating treatment.

Comparative Example 2

The present comparative example provides a conventional ceramic slurry coated lithium ion battery separator having a thickness of 22 μm, wherein a base film is a polypropylene base film having a thickness of 16 μm and a porosity of 47%; and coating layers were formed by coating the conventional ceramic slurry on two sides, and the thickness of the coating layer on each side surface was 3 μm.

Products of the Examples and Comparative Examples were tested by the following tests.

I. Electron microscopy scanning was performed on the composite lithium battery separator of Example 1. FIG. 1 is an electron microscopy image.

As can be seen from FIG. 1, this composite lithium battery separator has a porous structure and has a quite high porosity, therefore, the composite lithium battery separator fabricated according to the method of the present disclosure has high ion conductivity and good liquid absorption/retention capacity.

II. The composite lithium battery separator of Examples 1-5, the lithium battery separator of Comparative Example 1 and the lithium ion battery separator of Comparative Example 2 were detected for coating porosity, heat shrinkage data, interface adhesion between the coating layer and the electrode piece and bending strength of the battery cell, wherein the interface adhesion was tested under condition of a temperature of 90° C. and a pressure of 8 MPa for 1 min, and the electrode piece was a lithium cobaltate electrode piece. All of the detection data results are as shown in Table 1 below.

TABLE 1

Detection Data Results of Products

| | Unit | Example 1 | Example 2 | Example 3 | Example 4 | Example 5 | Comparative Example 1 | Comparative Example 2 |
|---|---|---|---|---|---|---|---|---|
| Base film | | PP: 16 um | PP: 12 um | PE: 12 um | PP/PE/PP: 20 um | PP + Ceramic: 16.9 um | PP: 16 um | PP: 16 um |
| Coating thickness | um | 7.3 | 6.1 | 4.6 | 4.4 | 1.6 | 0.0 | 6.6 |
| Coating layer thickness | | 23.3 | 18.1 | 16.6 | 20.4 | 18.5 | 16.0 | 22.6 |
| Coating porosity | % | 65.9 | 61.2 | 60.5 | 60.2 | 58.0 | / | 52.0 |
| Heat shrinkage (105° C., 1 H) MD | % | 1.1 | 0.7 | 2.5 | 1.0 | 0.8 | 1.5 | 1.3 |
| Heat shrinkage (105° C., 1 H) TD | % | 0.0 | 0.0 | 0.0 | 0.0 | 0.0 | 0.0 | 0.2 |
| Heat shrinkage (130° C., 1 H) MD | % | 2.1 | 2.3 | 6.0 | 2.3 | 1.5 | 3.5 | 3.0 |
| Heat shrinkage (130° C., 1 H) TD | % | 0.0 | 0.0 | 4.2 | 0.0 | 0.0 | 0.8 | 0.5 |
| Bonding strength between coating and electrode piece | N/m | 41.8 | 38.0 | 32.4 | 33.5 | 20.2 | 0.0 | 0.0 |
| Bending strength of battery cell | Mpa | 58.3 | 51.6 | 43.2 | 45.5 | 36.4 | 20.0 | 30.5 |

It can be seen from the above table that the composite lithium battery separator prepared according to the method of the present disclosure has good heat shrinkage property, high adhesion to the electrode piece, and high bending strength of the battery cell, thus being obviously superior to the separator not coated with the coating and the separator coated with the ceramic slurry in the comparative examples.

Comparative Example 1 and Comparative Example 2 are a polyolefin separator and a ceramic separator, wherein the polyolefin separator may provide sufficient mechanical strength and chemical stability at a normal temperature, but may exhibit greater heat shrinkage under high temperature conditions, bringing the positive and negative poles into contact and rapidly accumulating a large amount of heat, resulting in generation of high gas pressure inside the battery, thereby causing combustion or explosion of the battery. With the development of the trend of thickness reduction of the separator, a relatively high puncture risk and relatively low thermal stability will be confronted by a relatively small thickness, so that separator enterprises strengthen the separators by means of ceramic coating on the surface of the separators or coating a water-based polymer on the surface of the ceramic film, but the bonding capacity between the separator and the electrode piece, or the liquid absorption capacity of the separator to electrolyte cannot be well improved, so that the safety performance of the battery cannot be well guaranteed.

Figure 2:
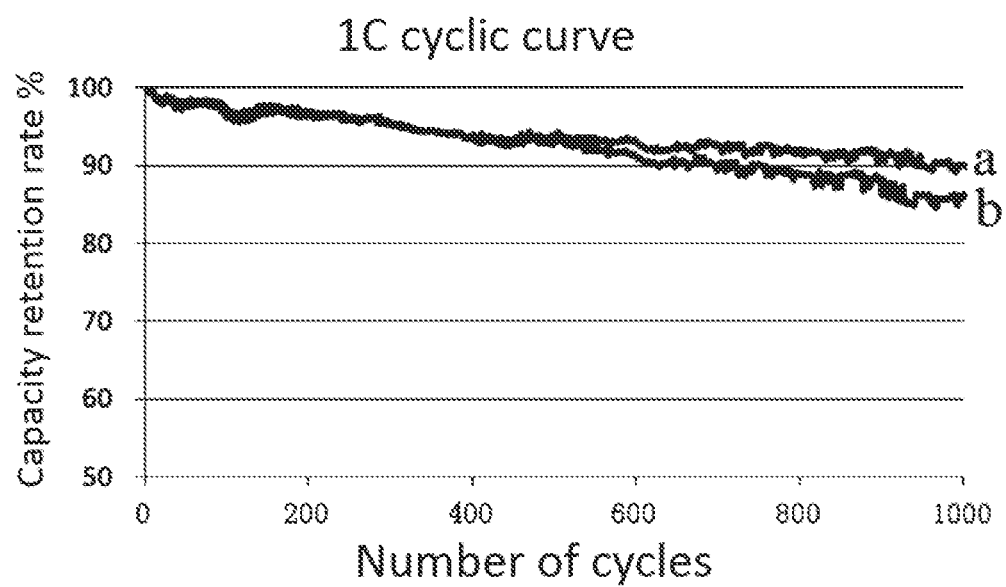
FIG. 2 is a data graph of a pouch battery for cycle test prepared in Example 1 and Comparative Example 2 of the present disclosure.

III. A pouch battery was prepared with the composite lithium battery separator of Example 1 and the lithium ion battery separator of Comparative Example 2 under the same process and conditions, and the cycle test was carried out under charging and discharging at a rate of 1 C. FIG. 2 is a data graph of the cycle test.

In FIG. 2, line a represents a change trend of the capacity retention rate of the pouch battery corresponding to Example 1 accumulated with the number of cycles, and line b represents a change trend of the capacity retention rate of the pouch battery corresponding to Comparative Example 2 accumulated with the number of cycles. It can be seen from FIG. 2 that: the capacity retention rate of Example 1 is stable compared with Comparative Example 2, because the polymer resin used in the present disclosure has a lower specific gravity than the ceramic particles used in Comparative Example 2, which is advantageous for improving the energy density of the lithium ion battery, and compared with the conventional ceramic slurry, the polymer resin has a lower hardness than aluminum oxide, then causing small loss to equipment during the production.

Although the present disclosure has been illustrated and described with specific examples, it should be realized that the various examples above are merely used for illustrating the technical solutions of the present disclosure, rather than limiting the present disclosure; those ordinarily skilled in the art should understand that, without departing from the spirit and scope of the present disclosure, they still could modify the technical solutions recited in various preceding examples, or make equivalent substitutions to some or all of the technical features therein; and these modifications or substitutions do not make the corresponding technical solutions essentially depart from the scope of the technical solutions of various examples of the present disclosure; therefore, it means that the attached claims cover all of these substitutions and modifications within the scope of the present disclosure.

INDUSTRIAL APPLICABILITY

The composite lithium battery separator of the present disclosure has high ion conductivity, good liquid absorption/retention capacity, strong peeling resistance, and high adhesion to positive and negative electrode pieces. The method for preparing a composite lithium battery separator in the present disclosure is applicable to mass production, further improving the practicability and economic efficiency thereof.

What is claimed is:

1. A composite lithium battery separator comprising:
   a base film or a ceramic film; and
   a coating layer covering a single side or two sides of the base film or the ceramic film, wherein the coating layer is formed by coating a slurry, wherein the slurry comprises, in percentage by weight, 5%-45% of a coating polymer and 55%-95% of an organic solvent, and wherein the coating polymer comprises, in parts by weight, 10-100 parts of a fluorine resin polymer or acrylic resin polymer, 0.5-10 parts of a polymer adhesive and 0-90 parts of inorganic nanoparticles,
   wherein the inorganic nanoparticles are a mixture of conventional inorganic particles and inorganic particles having lithium ion conducting capability, and a weight ratio of the conventional inorganic particles to the inorganic particles having lithium ion conducting capability is 80-95:20-5, and wherein a particle size of the conventional inorganic particles ranges 0.01-10 μm; and
   the conventional inorganic particles are composed of inorganic particles with a big particle size and inorganic particles with a small particle size in a weight ratio of 80-90:20-10, a particle size of the inorganic particles with a small particle size ranges 0.01-0.2 μm, and a particle size of the inorganic particles with a big particle size ranges 0.2-10 μm.

2. The composite lithium battery separator according to claim 1, wherein a thickness of the base film is 5-30 μm; a porosity of the base film is 30%-60%; and a thickness of the coating layer is 0.5-10 sm.

3. The composite lithium battery separator according to claim 1, wherein the base film comprises a polyethylene base film, a polypropylene base film, a polypropylene/polyethylene/polypropylene composite base film, a polyimide base film, a polyvinylidene fluoride base film, a polyethylene nonwoven base film, a polypropylene nonwoven base film or a polyimide nonwoven base film.

4. The composite lithium battery separator according to claim 1, wherein the slurry comprises an organic solvent, and wherein the organic solvent comprises acetone, dimethylacetamide, dimethylformamide, chloroform, dichloromethane, dichloroethane, dimethyl sulfoxide or N-methylpyrrolidone.

5. The composite lithium battery separator according to claim 1, wherein the fluorine resin polymer or acrylic resin polymer comprises polyvinylidene fluoride, a polyvinylidene fluoride and hexafluoropropylene copolymer, a polyvinylidene fluoride and dichloroethylene copolymer, polystyrene, n-butyl polyacrylate, polymethyl methacrylate, polyethylmethacrylate, poly(t-butyl acrylate), polyvinyl acetate, polyacrylonitrile, polyvinyl acetate, acrylamide or polymethyl acrylate, and a molecular weight of the fluorine resin polymer or acrylic resin polymer is 50000-500000.

6. The composite lithium battery separator according to claim 1, wherein the polymer adhesive comprises styrene-butadiene latex, styrene-acrylic latex, polyvinyl acetate, polyvinyl alcohol, polyethyl acrylate, polybutyl methacrylate, an ethylene-vinyl acetate copolymer or polyurethane.

7. The composite lithium battery separator according to claim 1, wherein the conventional inorganic particles comprise aluminum oxide, silica, barium titanate, magnesium oxide, boehmite, titanium oxide, calcium carbonate or zirconium dioxide.

8. The composite lithium battery separator according to claim 1, wherein the inorganic particles having lithium ion conducting capability comprise lithium phosphate, lithium titanium phosphate, lithium aluminum titanium phosphate, lithium nitrogen compound or lanthanum lithium titanate.

9. The composite lithium battery separator according to claim 1, wherein the coating polymer further comprises 0.5-10 parts by weight of a dispersing agent, and wherein the dispersing agent comprises a carboxylate fluorine dispersing agent, triethyl phosphate, a sulfonate fluorine dispersing agent, sodium polyacrylate, potassium polyacrylate or polyethylene glycol.

10. The composite lithium battery separator according to claim 1, wherein the coating polymer further comprises 0.1-8 parts by weight of a wetting agent, wherein the wetting agent comprises, sodium lauryl sulfate, sodium dodecyl benzene sulfonate, sodium polyacrylate, polyvinyl alcohol, fluoroalkyl methoxy ether alcohol, fluoroalkyl ethoxy ether alcohol, alkylphenol polyoxyethylene ether, fatty alcohol polyoxyethylene ether, fatty acid polyoxyethylene ether or polyoxyethylene alkyl amide.

11. The composite lithium battery separator according to claim 1, wherein the coating polymer further comprises 0.1-10 parts by weight of a pore-forming agent, and wherein the pore-forming agent is deionized water.

12. The composite lithium battery separator according to claim 1, wherein the coating polymer further comprises 0.1-5 parts by weight of an antistatic agent, wherein the antistatic agent comprises octadecyl dimethyl quaternary ammonium nitrate, trimethyl octadecyl ammonium acetate, N-hexadecylpyridine nitrate, N-alkyl amino acid salt, betaine type or imidazoline salt derivatives.

13. A method for preparing the composite lithium battery separator according to claim 1, wherein the method comprises:
S1, uniformly stirring weighed fluorine resin polymer or acrylic resin polymer and inorganic nanoparticles or uniformly stirring weighed fluorine resin polymer or acrylic resin polymer;
S2, adding an organic solvent according to a change gradient of a solid content, and stirring a resultant uniformly;
S3, adding a polymer adhesive, and after stirring uniformly, filtering the resultant to obtain a slurry; and
S4, coating the slurry on a single side or two sides of a base film or a ceramic film, and performing coagulation, rinsing, drying, and shaping to obtain the composite lithium battery separator.

14. The method for preparing the composite lithium battery separator according to claim 13, wherein in the step S1, a stirring speed is 40-80 R, and a stirring duration is 15-40 min; and wherein in the step S3, a stirring speed is 20-60 R, a dispersing speed is 300-800 R, a stirring duration is 15-30 min, and a slurry viscosity is 50-1000 cp.

15. The method for preparing the composite lithium battery separator according to claim 13, wherein in the step S2, 0.5-10 parts by weight of the dispersing agent is first added and stirred, and wherein a stirring speed is 40-90 R, and a stirring duration is 10-20 min, and then the organic solvent is added.

16. The method for preparing the composite lithium battery separator according to claim 13, wherein adding the organic solvent comprises:
adding the organic solvent gradually according to 4%-5% of a total amount of the organic solvent, wherein addition is stopped when powder is just kneaded and agglomerated, kneaded powder is stirred at a stirring speed of 80-120 R for 30-90 min; and
adding the organic solvent according to the change gradient of the solid content, so that the solid content of the slurry is decreased from high to low until a predetermined solid content is met.

17. The method for preparing the composite lithium battery separator according to claim 16, wherein when the solid content is higher than the predetermined solid content, a stirring speed is 40-100 R, a dispersing speed is 2000-4000 R, and a stirring duration is 15-45 min, and wherein the solid content meets the predetermined solid content, a stirring speed is 40-80 R, a dispersing speed is 3000-4500 R, and a stirring duration is 30-90 min.

18. The method for preparing the composite lithium battery separator according to claim 13, wherein in the step S4, a coating method comprises a dip coating method, a microgravure coating method, a spray coating method, a slide coating method or a slot coating method, and wherein a drying temperature is 40-80° C.

* * * * *